March 3, 1970     F. REIFENHÄUSER     3,497,916
APPARATUS FOR FORMING VALVE POCKETS IN PLASTIC FILM
Filed Jan. 7, 1966     5 Sheets-Sheet 1

INVENTOR.
FRIEDRICH REIFENHÄUSER
BY
Meyer, Tilberry & Body
ATTORNEYS

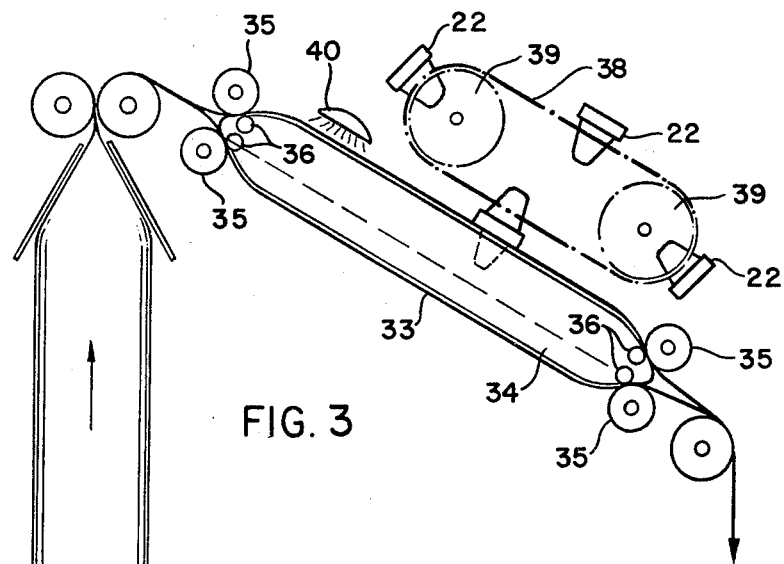
FIG. 3
FIG. 4
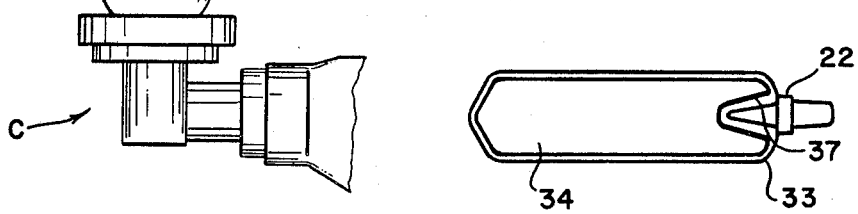
FIG. 5
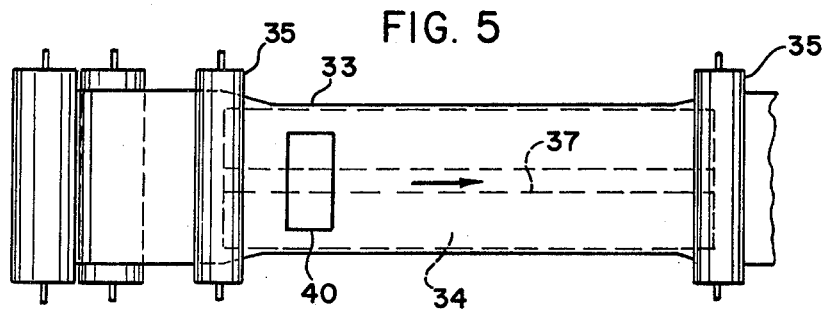

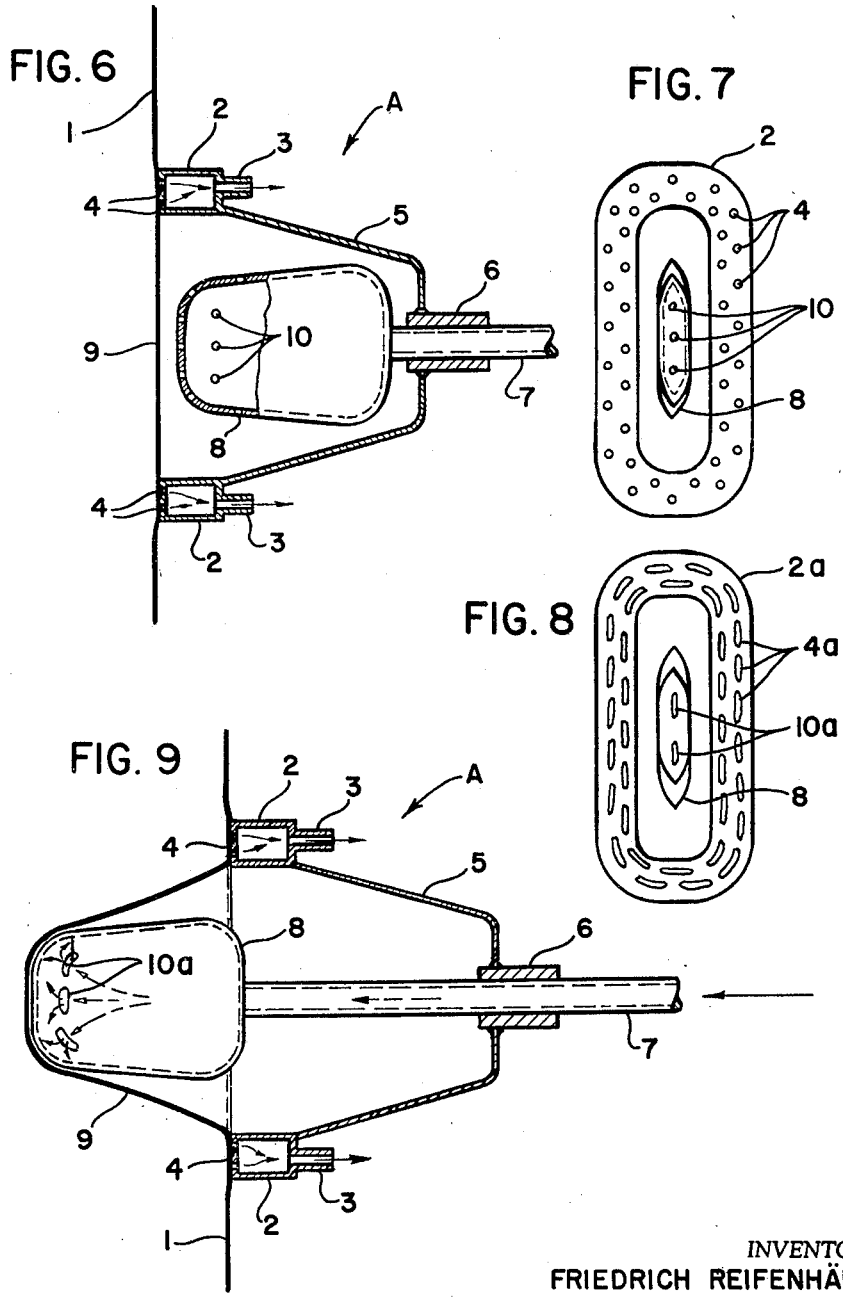

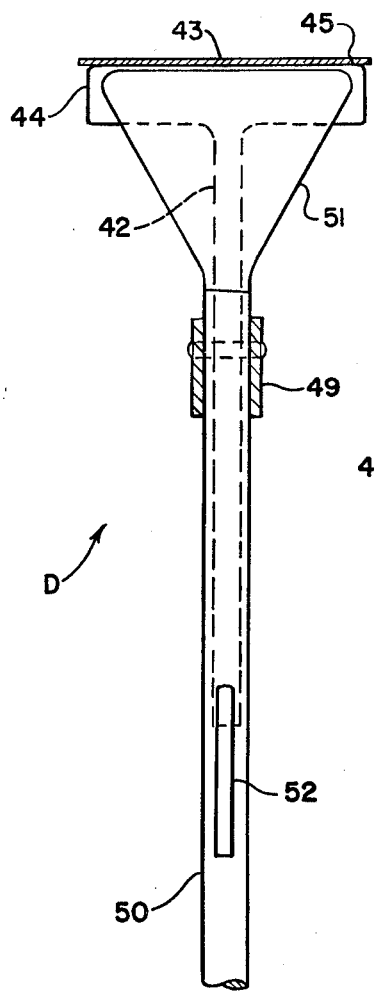
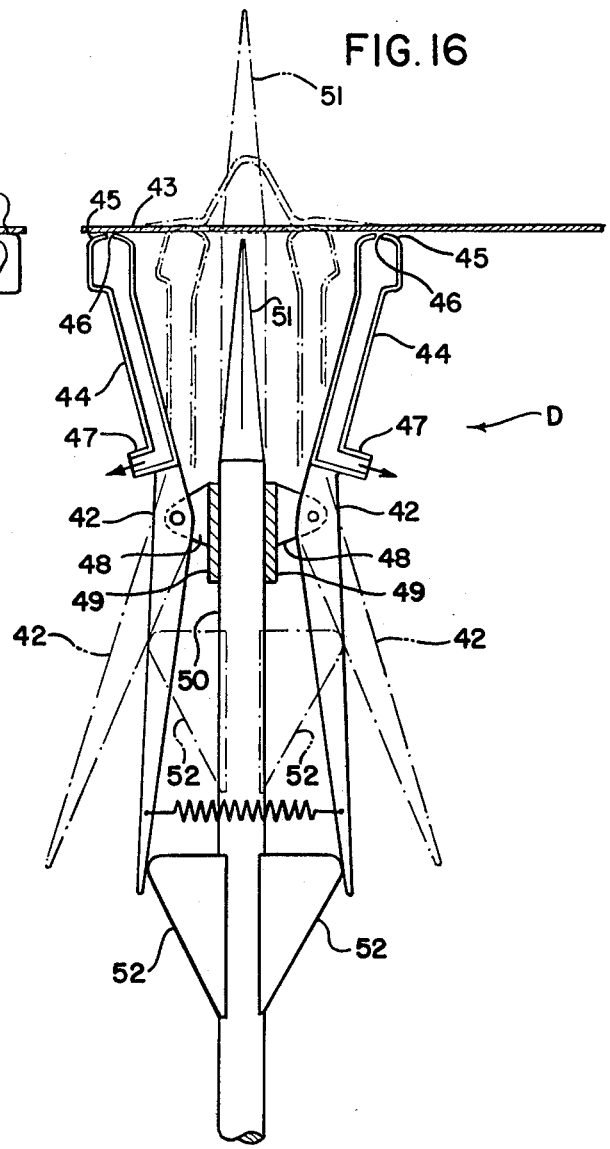

United States Patent Office 3,497,916
Patented Mar. 3, 1970

3,497,916
APPARATUS FOR FORMING VALVE POCKETS
IN PLASTIC FILM
Friedrich Reifenhäuser, Troisdorf, Germany, assignor to
Reifenhauser K.G., Troisdorf, Germany
Filed Jan. 7, 1966, Ser. No. 519,383
Claims priority, application Germany, Feb. 1, 1965,
R 39,782
Int. Cl. B29d 7/22; B29c 17/00
U.S. Cl. 18—19                                      4 Claims

ABSTRACT OF THE DISCLOSURE

Valve pockets are formed in plastic film by means of a deforming device which is moved synchronously with the film. The deforming device may include a suction means for retaining spaced points of the film. The film is deformed in the area between the retained spaced points by means of suction or by a reciprocating mandrel. The mandrel may cooperate with the suction retaining device to move the retained spaced points closer together prior to formation of the pocket. The film may be tubular when the pocket is formed and may be fused together transversely of its length along lines which bisect the pockets so that adjacent bags are formed in the tubular film with each bag having a valve defined by one-half of the pocket which was formed.

This invention relates to an apparatus for forming a filling and sealing means in plastic film. More particularly, the invention relates to an apparatus for forming a pocket in the wall of tubular or flat plastic film which may be punctured to provide entry for filling a container formed of the film.

The use of plastic film for packaging purposes has greatly increased in recent years due to the versatility of the material. Both solids and liquids may be packaged in containers or bags formed of plastic film and many types of film are readily available to provide the various thicknesses and physical characteristics necessary for different packaging applications.

Containers formed of thermoplastic film are the most widely used since this type of material is easily heat-fused to provide an airtight seal. This is particularly desirable in the case of packaged foods and other perishable goods.

Thermoplastic film is normally formed by extruding the material in tubular form and then expanding the product by air inflation immediately after extrusion such as is shown and described in my copending U.S. patent application, Ser. No. 484,609, filed Sept. 2, 1965. This is usually accomplished in a continuous process and when the tubular product has been sufficiently cooled, it is flattened and taken up in large rolls. Containers may then be easily formed from the tubular stock by fusing the adjacent walls of the film together by the application of heat in spaced, transverse zones. The stock is then cut transversely through the zones to provide separate containers or bags.

The most common method of filling the bags with the goods to be packaged comprises cutting a small slit in one wall of the film, introducing the material to be packaged, and then applying a patch over the slit which is heat sealed to the surrounding walls of the container. It will be apparent that with this method of filling and sealing, the bag may not be filled to capacity since excess film must be available to provide the slack necessary during the sealing.

When containers formed of plastic film are filled in this manner, a filling nozzle must be inserted through the slit. This is a cumbersome and time-consuming process.

The apparatus of the present invention afford an improved means for filling and sealing containers formed of plastic film which permits the entire volume of the container to be filled and which eliminates the need for a separate patch.

According to the present invention, a filling and sealing means in the form of a pocket is formed in the wall of the film by gripping the wall by suction on the perimeter of an area in which the pocket is to be formed. The wall portion within the perimeter is then deformed by mechanical or pneumatic means to form a pocket.

The apparatus of the present invention comprises an annular film engaging member having openings formed in the film engaging surface thereof, means for creating a vacuum at the openings so that the film will be tightly gripped by suction and means located within the annular member for deforming the film to form a pocket.

The means for deforming the material may be either a cavity formed within the annular member and co-operating with a vacuum means for drawing the material into conformity with the cavity, or a reciprocating mechanical device which physically forces the wall of the film into the desired form.

The apparatus of the invention thus provide a pocket in the film wall that may be punctured to provide access to a container formed of the film for introduction of material to be packaged. The walls of the pocket around the puncture press against the filling nozzle to prevent escape of material so that the container may be filled to capacity. After the container has been filled, the side walls of the pocket may be fused together to seal the contents.

The pockets may be formed if desired at a location corresponding to the separation line between two consecutive containers. In this way one pocket may serve as filling and sealing means for two different bags.

If the deformation of the material is performed after the film has cooled following extrusion, the film first heated in the area where the pocket is to be located to the proper forming temperature prior to the deforming operation.

Where a mechanical reciprocating device is used to provide the pocket, it is desirable that the foil engaging portion thereof be provided with holes or slots connected to a vacuum line. Accordingly after the reciprocating member has forced the wall of the film outwardly, an air-blast may be introduced through the openings to provide separation from the material.

Where the deforming is accomplished pneumatically, a suitable cavity is provided in the device and provided with holes or slots communicating with a vacuum line. The vacuum line may be switched to a pressure source when desired to provide air pressure for releasing the newly formed pocket from the cavity.

When film is formed by a continuous extrusion of the plastic in tubular form, followed by expansion of the film by air inflation, it is particularly desirable to form the pocket while the film is inflated and at a high temperature before it is flattened out in rolls. To accomplish this a continuous belt is mounted adjacent to the moving film and forming units are attached thereto at spaced intervals. The belt moves at the same speed as the film and the units engage the film wall and form the pockets at the desired spacings. The belts may be located either inside of the tubular film or outside as desired.

It is also possible according to the invention to perform the operation after the film has cooled and has been flattened out in rolls. However, the area in which the pocket is to be formed must be heated to the desired forming temperature. To accomplish this the flattened film is carried over an expanding mandrel. While moving over the mandrel, the portion of the film to be deformed is heated and a conveyor carrying the operating units is operated at the same speed as the film. The forming units engage the heated portion of the film wall and form the pockets at the desired spacings.

According to another aspect of the invention, a forming unit is provided which includes two holding members adapted to engage the film on opposite sides of a perimeter within which a pocket is to be formed. The holding members are fastened to ends of two lever arms which are pivotally attached for movement in scissor-like fashion on a sleeve slidably received on a reciprocating rod which carries a plunger. The shaft has a cam located thereon which engages the lever arms above the pivot points. When the plunger is moved downwardly to engage the film wall, the cam forces the members inwardly. The plunger serves to mechanically form the pocket and the lever arms move inwardly towards the plunger to provide some slack in the foil and facilitate the deforming of the material.

Another object of the invention is to provide an apparatus for forming filling and sealing pockets in plastic film while the film is heated to a suitable deforming temperature, whereby the apparatus is adaptable for use in a continuous process and can form the pockets at spaced intervals without interruption in the flow of the material.

It is also an object of the invention to provide an apparatus of compact, low-cost construction for forming a permanent filling and sealing pocket in plastic film, which can be easily adapted for use in connection with conventional manufacturing equipment and processes and which can be operated by readily available pneumatic pressure and vacuum sources.

The invention may take physical form and specific embodiments are shown and described in the following detailed description and drawings wherein:

FIGURE 3 is a schematic diagram showing the extrusion and expansion by inflation of tubular film followed by cooling, flattening and subsequent passing of the tubular film over a mandrel for the continuous forming of spaced pockets according to the invention;

FIGURE 4 is a partial and elevational view showing the mandrel and the forming units used in FIGURE 3;

FIGURE 5 is a plan view showing the tubular film being passed over the mandrel shown in FIGURE 3;

FIGURE 6 is a sectional view showing a mechanical forming unit embodying the invention;

FIGURE 7 is an end elevational view of the unit of FIGURE 6;

FIGURE 8 is an end elevational view of a modified form of the unit shown in FIGURE 6 wherein the film engaging face of the unit has slots formed therein;

FIGURE 9 is a sectional view of the forming unit of FIGURE 6 showing the plunger in its deforming stroke;

FIGURE 15 is an elevational view and a deforming tool embodying the invention; and FIGURE 16 is a transverse sectional view of the tool of FIGURE 15 showing the tool in its preparatory position in solid lines and in its final deforming position in dot-dash lines.

Figure 14:
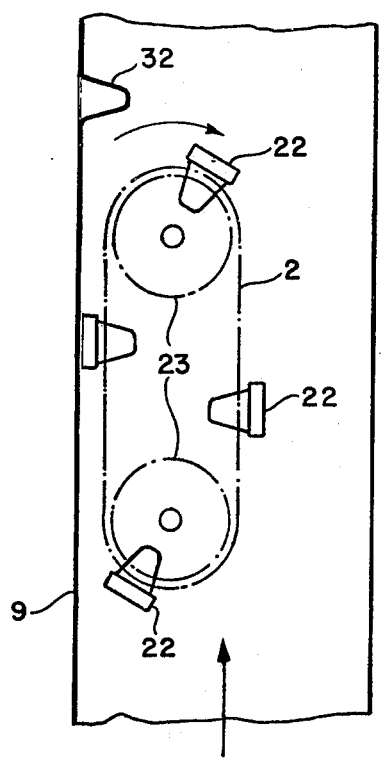
FIGURE 14 is a schematic diagram showing extruded tubular film formed as shown in FIGURE 13 with a deforming unit located inside the film for continuously forming spaced pockets according to the invention.

Referring more particularly to the drawings which illustrate preferred embodiments of the invention and are not for the purpose of limitations, FIGURES 6–9 show a mechanical forming unit embodying the invention. The unit is adapted to hold the film 1 by means of a hollow annular member 2 or 2a having a film engaging face provided with holes 4 or slots 4a and an interior which is evacuated through vacuum lines 3. The annular member 2 is fastened to a frame 5 which carries a sleeve 6. The sleeve receives a hollow shaft 7 adapted for reciprocating movement therein. Mounted on the shaft 7 is a plunger 8 which has a suitable form to provide the desired shape for a pocket to be formed in the film.

When the plunger 8 is moved toward the film 9, it stretches and deforms the film 9 within the area enclosed by the annular member 2 to the condition shown in FIGURE 9. Since this operation is performed when the film is at its deforming temperature, a packet is permanently formed in the wall of the film. After the forming operation is completed, the plunger 8 may be separated from the stretched film 9 by means of a blast of hot or cold air supplied by the hollow shaft 7. The air is emitted through holes 10 or slots 10a formed in the film engaging face of the plunger 8. This prevents the film 9 from sticking to the plunger 8 and moving with it during its rearward stroke.

Figure 10:
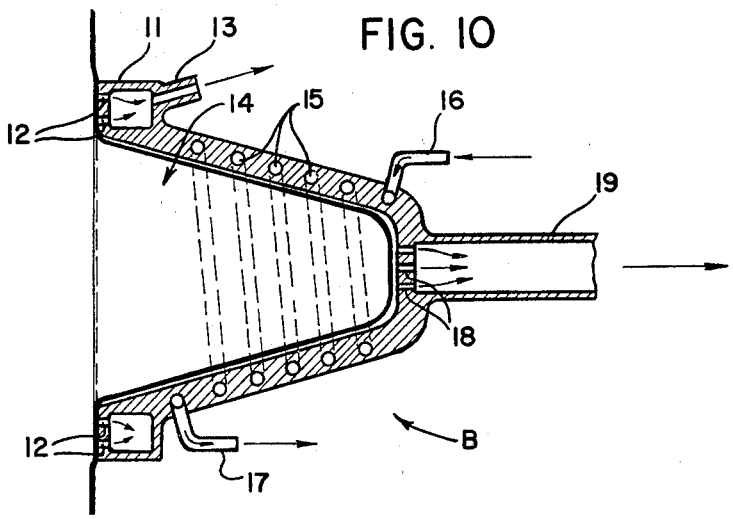
FIGURE 10 is a sectional view of vacuum type unit embodying the invention.
Figure 11:
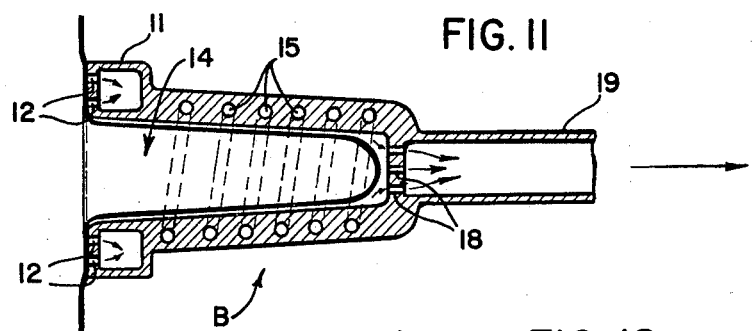
FIGURE 11 is a sectional view of the unit of FIGURE 6 taken on a line at right angles to the plane of FIGURE 10.
Figure 12:
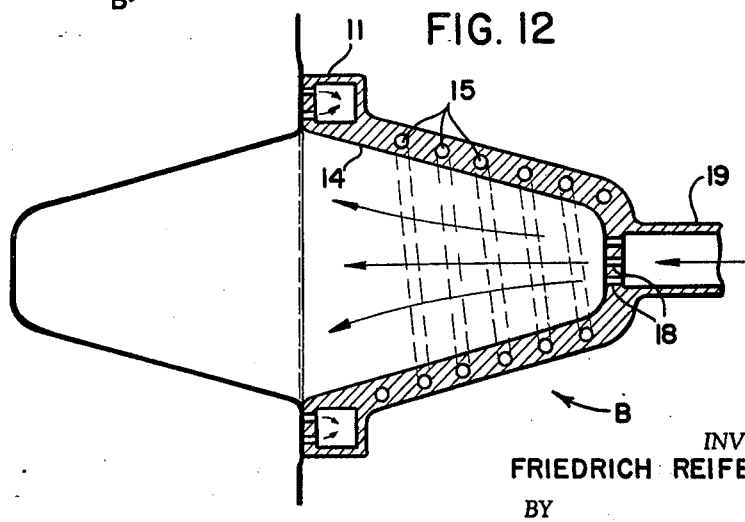
FIGURE 12 is a sectional view of the vacuum forming unit of FIGURE 10 showing the unit applying air pressure to force the newly formed pocket out of the forming cavity.

FIGURES 10 to 12 show another type of forming unit B which utilizes a vacuum for deforming the film. The unit includes a hollow annular member 11 which is provided as before with openings 12 and which communicates with a vacuum line 13. The frame of the unit forms a cavity 14. The interior of the cavity 14 defines small passages 15 which communicate with a supply line 16 and an outlet line 17. The passages 15 may be used for heating or cooling fluid as desired. At the base of the cavity 14 are openings 18 which communicate with a vacuum line 19. The line 19 is connected to a system which may provide either a vacuum or air pressure as desired. When a vacuum is supplied through the line 19, the film is drawn into the cavity 14 to deform the film and provide the desired pocket. After the forming operation is completed, hot or cold air is blown through the line 19 into the cavity 14 to push the film out of the cavity 14. This operation may of course also be performed mechanically by means of a reciprocating ejector operated by mechanical linkage in the vacuum line.

Where plastic film is being extruded continuously in tubular form, it is desirable to form the pockets at spaced intervals during the forming process. Accordingly the forming units may be arranged to travel synchronously with the tubular film. It is particularly desirable that this forming be achieved while the film is expanded by air inflation prior to being flattened and rolled onto takeup reels. While the film is in this condition, it is heated to a proper forming temperature and thus there is no need for special heating equipment.

Figure 13:
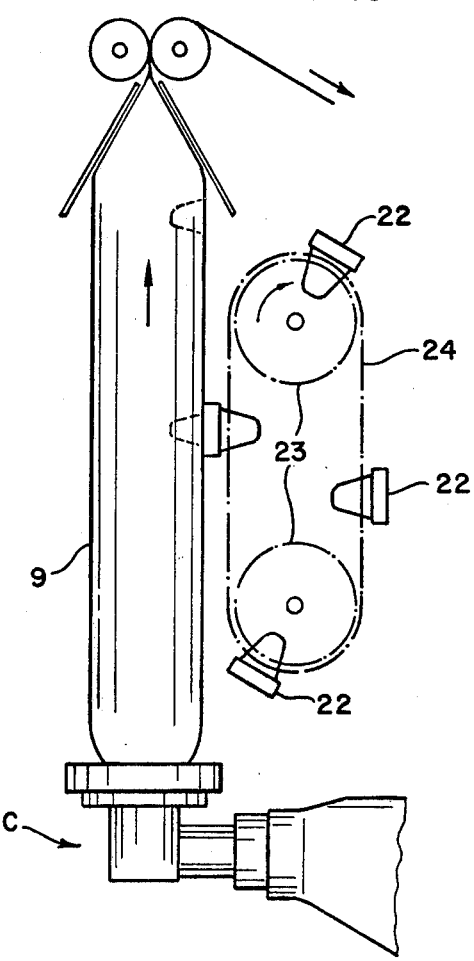
FIGURE 13 is a schematic diagram showing the extrusion and expansion by inflation of tubular film followed by the continuous forming of spaced pockets in the film while it is still heated.

Accordingly this may be accomplished as shown in FIGURE 13 wherein tubular film 9 is being formed by an extrusion head C and then expanded by air inflation. The forming units 22 are mounted on an endless conveyor belt 24 driven by conveyor rollers 23. The conveyor belt 24 is mounted adjacent the tubular inflated film 9 and the units 22 engage the wall of the film 9 at spaced intervals.

The endless conveyor belt 24 may be located within the inflated tubular film 9 as shown in FIGURE 14 if desired, in which case the rollers 23 must be supported from the extrusion head C.

Figure 1:
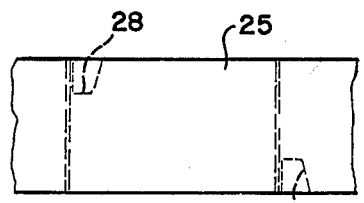
FIGURE 1 is a fragmentary top elevational view of flattened tubular plastic film showing in dashed lines, pockets formed therein according to the invention and showing transverse fused portions in dashed lines separating the tubular film into individual compartments.
Figure 2:
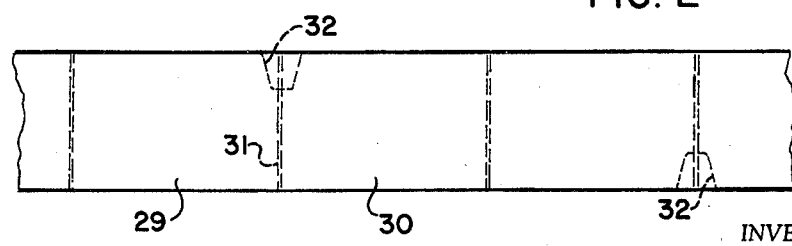
FIGURE 2 is a fragmentary top elevational view of flattened tubular plastic film having transverse fused portions shown in dashed lines, which separate the film into individual compartments, and having pockets formed therein at the transverse fused portions so that each pocket is between two compartments.

Pockets 28 can be provided for each individual bag as shown in FIGURE 1 in which case the flattened tubular film 9 is fused on transverse paths 27 and later cut along the fused portions 27 to separate the tubular film into independent individual containers 25, 26.

Where the pockets are formed with a sufficient width, one may be used for two different containers as shown in FIGURE 2 by fusing the film through the center of the pocket 32 so that each of the two bags 29, 30 resulting when the seam 31 is cut receives a pocket of suitable size. It is desirable in any event that the pockets be located close to a corner of the bag so that the bag can be filled to capacity without difficulty. It is also advisable to locate the pockets on alternate sides of the tubular foil so that they will be uniformly distributed on both sides of the roll when the foil is rolled up.

FIGURES 3-5 illustrate an embodiment of the invention wherein the forming operation is preformed after the extruded tubular film has been cooled and flattened on rolls. According to this embodiment, a hollow mandrel 34 is suitably located within the walls of the film 33 so as to expand the flattened film into tubular form. The mandrel 34 is supported from outside the walls of the film 33 by means of rollers 35, 36 located at opposite ends of the mandrel 34. The mandrel 34 has a channel 37 formed therein which provides operating room for the forming process. Here again the forming process is accomplished synchronously with the movement of the film 33 by means of a conveyor belt 38 having forming units 22 mounted thereon in the same manner as shown in FIGURE 13. The forming units 22 may of course be of either the vacuum type or mechanical type discussed above. The conveyor belt 38 is operated by rollers 39 which move the belt at the same rate as the foil 33.

Since it is necessary to heat the film to its forming temperature prior to the deforming thereof, a heating unit 40 is provided as shown in FIGURE 3. The unit 40 is located to heat the film to the desired temperature prior to the deforming operation.

FIGURES 15 and 16 show another type of forming unit D embodying the invention. The unit D includes two lever arms 42 which carry hollow film engaging members 44. The members 44 are adapted to engage and hold the film wall 42. The film engaging portions 45 of the members 44 are provided with slots or perforations 46 and the interiors of the members 44 communicate with vacuum lines 47 to provide the desired suction for gripping the film. The lever arms 42 are pivoted in scissor-like fashion on brackets 48 attached to a sleeve 49. The sleeve 49 is mounted on a frame (not shown) and is stationary relative to the film 43. Slidably received in the sleeve 49 is a reciprocating shaft 50 which carries a plunger 51 for mechanically deforming the film wall 43 to provide a pocket. Attached to the shaft 50 are two cams 52 as shown in FIGURE 16. As the plunger 51 moves forward into engagement with the film wall 43, the cams 52 push the upper ends of the lever arms 42 outwardly as shown in dot-dashed lines in FIGURE 16 so that the members 44 are drawn together to provide slack in the foil wall 43. The slack aids in the forming of the pockets and minimizes stretching of the film. This also eliminates the tendency of the film to return to its original shape after the deforming. The members 44 may have either a straight or curved form and may in some instances be adapted to enclose an oval shaped area when in their contracted condition.

In the practice of the invention in the various ways described above, the film during the deforming is stretched only enough to make it take the desired shape. In some instances, however, where a vacuum unit is used, the vacuum can be increased to such an extent that small perforations are formed in the wall of the film. This affords an additional advantage in that the container subsequently formed is provided with vent openings near the filling point to permit the escape of air while the container is being filled.

The invention has been described with reference to certain specific embodiments, however, many modifications may be made in the above construction and many widely different embodiments of the invention may be used without departing from the scope and spirit thereof. It is intended that all matter contained in the above description as shown in the accompanying drawings shall be interpreted as illustrative and not in a limiting sense.

Having thus described my invention, I claim:

1. Apparatus for forming valve pockets in tubular plastic film having interior and exterior surfaces comprising; feeding means for moving said film in a substantially linear path axially of its length, holding and forming means movably positioned adjacent only one of said surfaces for movement in the same direction as said film and at substantially the same speed as said film, said holding and forming means including a peripheral film engaging portion having suction openings therein, said holding and forming means further including drawing means for deforming an area of said film held by said engaging portion into a valve pocket, said holding and forming means being operative during movement thereof in the same direction as said film and at the same speed as said film to engage and draw valve pockets in said film.

2. The apparatus of claim 1 wherein a plurality of said holding and forming means are mounted in spaced-apart relationship on a movable mounting body.

3. The apparatus of claim 2 wherein said movable mounting body successively moves said holding and forming means in a linear path parallel to the longtiudinal axis of said film during formation of said valve pockets.

4. Apparatus for forming valve pockets in plastic film by localized deep drawing of the film comprising; holding and forming means for holding an area of film at the periphery of the area and deforming the film within the area, said holding means including a pair of spaced-apart suction members having suction openings therein for holding a peripheral portion of film against said suction members, said suction members being mounted on arm means and said arm means being pivotally attached to mounting means for pivotal movement of said arm means to move said suction members toward and away from one another, said forming means including mandrel means movably mounted on said mounting means for reciprocating movement toward and away from said suction members, said mandrel means including cam means and said arm means including cam follower means, said cam means cooperating with said cam follower means when said mandrel moves toward said suction members to pivot said arm means for moving said suction members toward one another.

References Cited

UNITED STATES PATENTS

| | | |
|---|---|---|
| 2,968,064 | 1/1961 | Howell. |
| 2,064,514 | 12/1936 | Balz. |
| 2,134,364 | 10/1938 | Glougie. |
| 2,441,097 | 5/1948 | Hicks. |
| 2,962,758 | 12/1960 | Politis. |
| 2,989,780 | 6/1961 | Zimmerman. |
| 3,180,776 | 4/1965 | Hessel. |
| 3,027,596 | 4/1962 | Knowles _____ 18—21 XR |
| 3,124,840 | 3/1964 | Taylor et al. _____ 18—21 |
| 3,267,523 | 8/1966 | Schneider. |
| 3,238,565 | 3/1966 | Jacobs. |
| 3,268,952 | 8/1966 | Shelby. |

WILLIAM J. STEPHENSON, Primary Examiner

U.S. Cl. X.R.

18—14